Figures 1, 2, 3:
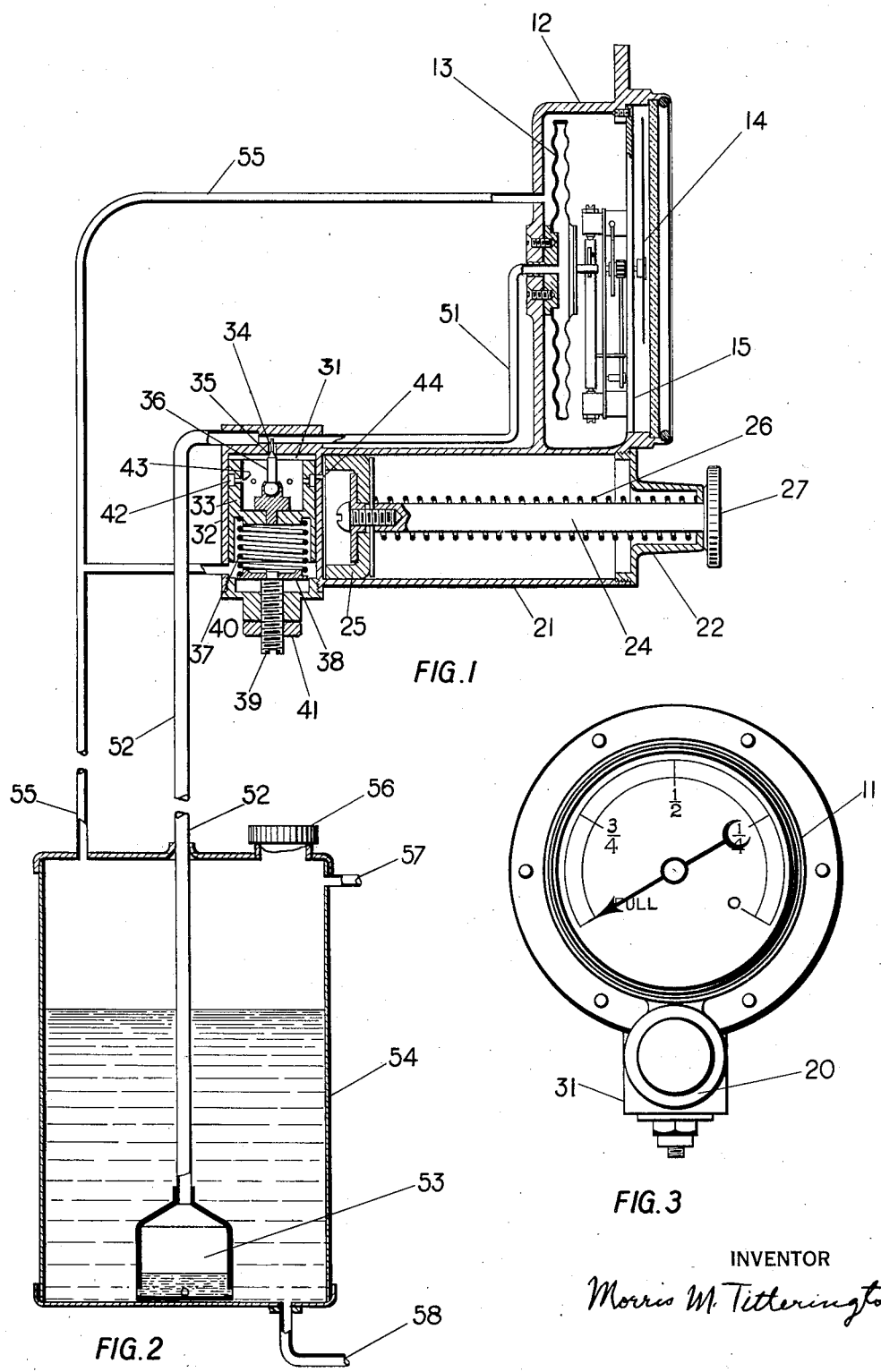

May 7, 1929.  M. M. TITTERINGTON  1,711,506
HYDROSTATIC GAUGE
Filed Oct. 16, 1924  2 Sheets-Sheet 1

INVENTOR
Morris M. Titterington

May 7, 1929.  M. M. TITTERINGTON  1,711,506
HYDROSTATIC GAUGE
Filed Oct. 16, 1924   2 Sheets-Sheet 2

INVENTOR
Morris M. Titterington

Patented May 7, 1929.

1,711,506

UNITED STATES PATENT OFFICE.

MORRIS M. TITTERINGTON, OF BROOKLYN, NEW YORK, ASSIGNOR, BY DIRECT AND MESNE ASSIGNMENTS, TO PIONEER INSTRUMENT COMPANY, INCORPORATED, OF BROOKLYN, NEW YORK, A CORPORATION OF NEW YORK.

HYDROSTATIC GAUGE.

Application filed October 16, 1924. Serial No. 743,927.

This invention relates to hydrostatic gauges and more particularly to gauges of this type for indicating the level of liquid in tanks as on automobiles, aircraft and the like.

An object of this invention is to provide a gauge which will continuously indicate the level of liquid in a tank or other container. A further object is to provide in connection with such a gauge, manually operable means for assuring the accuracy of the indication at any time. Other objects and advantages will appear as the invention is disclosed and described.

While practical embodiments of this invention are shown in the drawings and disclosed in these specifications, it will be understood that various modifications may be resorted to within the scope of the appended claims.

Figures 4, 5:
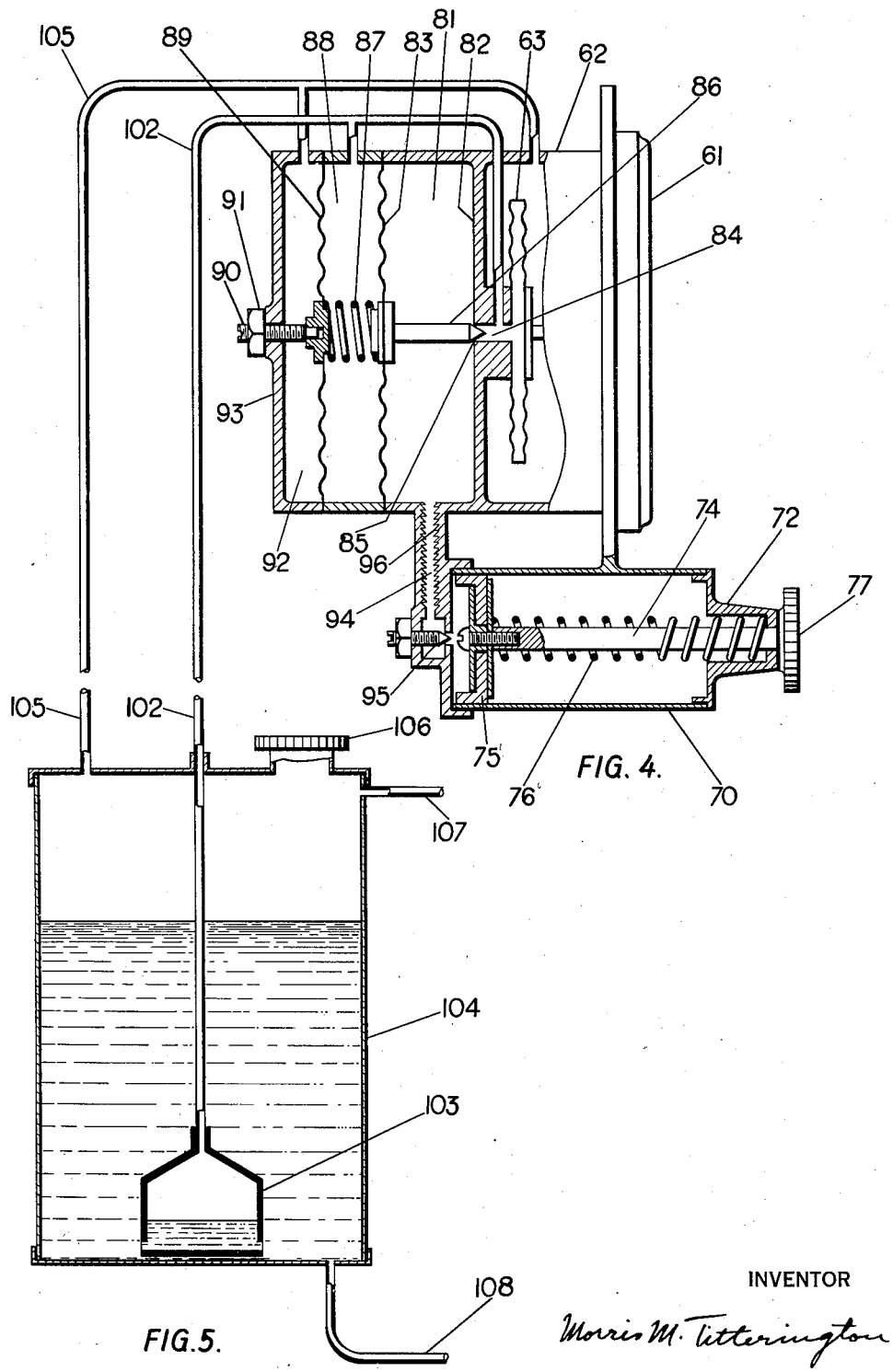

Referring to the drawings which illustrate what I now consider preferred forms of the invention:

Figure 1 represents an elevation, partly in section, of a gauge, pump and associated parts, Figure 2 is an elevation of the tank the level of the liquid in which is to be indicated, and Figure 3 shows a front view of the gauge and pump, Figure 4 shows an elevation, partly in section, of a gauge, pump and alternate arrangement of associated parts, Figure 5 represents a tank, similar to that of Figure 2, but associated with the gauge of Figure 4.

Referring more particularly to Figures 1, 2, and 3, gauge 11 comprises a case 12, a flexible chamber 13, means for transmitting movements of the flexible chamber to a hand 14, which moves relatively to a dial 15, for the purpose of giving indications. Associated with the gauge 11 is a pump 20. This pump comprises a barrel 21, which is closed at one end by a cap 22. Reciprocatively contained within the barrel 21 is a plunger, consisting of a rod 24 to one end of which is secured a flexible cup 25. Between the cup 25 and the cap 22 is a compression spring 26 surrounding the rod 24. At the end of rod 24 opposite from the flexible cup 25 is a knob 27 for the purpose of manually operating the pump.

At the rear of the pump barrel a valve chamber 31 is located. This chamber is formed by a cylinder 32 within which a piston 33 is reciprocatively contained. At one end of cylinder 32 is a passage 34, provided with a valve seat 35. A valve 36 is pivotally attached to the piston 33 and is adapted to normally close passage 34 by engaging valve seat 35. A spring 37 pressing against the piston 33 holds valve 36 in its normal closed position. A disk 38 presses against the opposite end of spring 37 and is adjustable to compress the spring 37 more or less by means of screw 39, which is threaded through the cylinder cap 40. The position of this screw 39 may be locked by nut 41.

On the outside of piston 33 is an annular groove 42. Holes 43 establish communication between the interior of the valve chamber 31 and annular groove 42. A hole 44 connects through the wall of the valve chamber and establishes communication between the pump cylinder and the valve chamber when valve 36 is in its normal closed position.

Passage 34 communicates by means of tube 51 to the interior of flexible chamber 13 in the gauge and also connects by means of tube 52 to a chamber 53 which is located near the bottom of the tank 54, the level of the liquid in which is to be measured.

If the liquid within the tank is subject to pressure other than atmospheric, a tube 55 connects between the top of the tank, the valve chamber 31 below the piston 33, and the interior of the gauge case 12, which is made otherwise air-tight. If the liquid within the tank is subject to atmospheric pressure, tube 55 may be dispensed with, and the gauge case 12 and the portion of the valve chamber 31 below the piston 33 left open to atmospheric pressure. Tank 54 is shown with a spout 56 for filling with liquid, a connection 57 near the top for applying pressure, and an outlet 58 for withdrawal of the liquid.

Referring now more particularly to Figures 4 and 5, gauge 61 comprises a case 62, flexible chamber 63, and other parts to complete the indicating mechanism, as in the case of gauge 11 previously described. Associated with the gauge 61 is a pump 70. This pump comprises parts similar to those of pump 20 already described, including a cap 72 and a plunger which consists of a rod 74 at one end of which is secured a flexible cup 75 and at the other end of which is a knob or handle 77.

At the rear of the gauge 61 a valve chamber 81 is located. This chamber is formed by the back of the gauge case 82, cylindrical sides of case 62 and a flexible wall 83. The center of the back of the gauge case 82 has a passage 84 provided with a valve seat 85. A valve 86 is attached to the center of the flexible wall 83 and is adapted to normally close passage 84 by engaging valve seat 85. A spring 87 pressing against the wall 83 holds the valve 86 in its normal closed position. Spring 87 is contained within a second chamber 88, one side of which is the flexible wall 83 previously described, and the other side of which is a similar flexible wall 89. Outside of this chamber 88, and adapted to press on the center of wall 89, and thereby compress spring 87, is an adjusting screw 90, which may be locked in position by a nut 91. This screw 90 passes into a third chamber 92, through a support 93. The support 93 may in some cases be an airtight wall, and in other cases need only be a bridge, as will be later explained.

Passage 84 communicates directly to the interior of chamber 63 of the gauge and also connects by means of the tube 102 to a chamber 103 located near the bottom of the tank 104. Tube 102 also connects to chamber 88. The connections at the tank 104 are similar to those already described in respect to the tank 54.

If the liquid within the tank is subject to pressure other than atmospheric, a tube 105 connects between the top of the tank, chamber 92 (support 93 then forming a closed wall) and the interior of the gauge case 62, which is made otherwise air-tight. If the liquid within the tank is subject to atmospheric pressure, tube 105 may be dispensed with, and chamber 92 and gauge case 62 left open to atmospheric pressure.

Between the pump 70 and valve chamber 81 is a passage 94. Means are provided for restricting this passage, as by needle valve 95; and means for causing turbulent flow, as the labyrinth grooves 96, may also be provided.

The operation of these systems as simple hydrostatic gauges is as follows, assuming that the entire system is initially full of air: As liquid is poured into the tank, it rises in chamber 53 (or 103) and compresses the air contained in the system in accordance with the hydrostatic head of the liquid. This pressure is therefore transmitted to the gauge and the latter may be calibrated so that it will indicate the level of the liquid in inches, gallons, pounds or other function of pressure head, as may be desired.

If the maintenance of a constant amount of air in the system could be assured, the gauge would continue to indicate the level of the liquid correctly at all times. However, experience has shown that various factors contribute to make it difficult or impossible to maintain the air in the system without auxiliary means. Changes in temperature, changes in pressure, minute leaks and other factors tend to reduce the amount of air in the system and to thereby reduce the indication of the gauge and to render it undependable as a quantitative indicator of the liquid level.

Errors resulting from these losses of air are minimized by the use of the chambers 53 and 103. If the tubes 52 and 102 were simply left open at their lower ends, it will be appreciated that a small loss of air would result in a relatively large change in liquid level within the tube. By terminating these tubes in chambers as shown, however, large losses of air result in only small changes in liquid level within the chamber, with consequent small changes in pressure head and in gauge indication.

In accordance with the present invention, means are provided for replenishing the air in the system to compensate for losses due to the factors which have been recited. The operation of the air replenishing mechanism, while similar in principle for the two systems which have been illustrated, will be separately described to avoid confusion due to the dissimilarity of parts. Referring first to the system illustrated in Figures 1, 2 and 3, the operation is as follows:

Whenever it is desired to ascertain accurately the liquid level, it is necessary to expel all liquid from the tube system. The plunger of the pump is therefore pulled forward, and released under the action of the spring 26. On the forward stroke, the flexible cup permits flow of air round its periphery, but on the return stroke it expands against the walls of the cylinder and prevents the escape of air past it. This air is therefore delivered through passage 44, annular groove 42 and holes 43 into the valve chamber 31. As this air enters the valve chamber, the pressure within the chamber is increased sufficiently to force the piston back against spring 37, and to open passage 34. Air is therefore admitted to tubes 51 and 52. Since tube 51 is connected only to the closed chamber 13 and the pipe 52, the air flows through the latter and blows out of the bottom of chamber 53, thereby clearing the system of liquid. The indication of the gauge following this clearing of the tube lines will be the correct level of the liquid in the tank.

In the operation just described, excessive pressure must be avoided, for if tube 52 were constricted or partially clogged with dirt, an excess pressure would be applied to the gauge which might damage it. Such excess pressures are avoided by the action of the piston 33 in the valve chamber. Should the air pressure exceed a safe figure, the piston will be blown back against the spring sufficiently to break the connection between passage 44 and the annular groove 42. The cylinder is thereby closed off from the valve chamber and no more air can be forced into the tube system until the pressure within the valve chamber becomes sufficiently reduced to permit the spring to return piston 33 into such position that the annular groove 42 is again in communication with passage 44. The pressure, at which the air from the pump will be cut off in this way, may be selected by increasing or decreasing the compression on spring 37 by means of screw 39.

In the system illustrated in Figures 4 and 5, neglecting for the moment the needle valve 95 and labyrinth grooves 96, the pump plunger 75 actuated by the spring 76 forces air into chamber 81. This forces wall 83 and valve 86 back against spring 87, permitting the air to flow into passage 84 and so into tube 102. As plunger 75 reaches the end of its stroke spring 87 closes valve 86. As tube 102 connects to chamber 88, the pressure on wall 83 is substantially equalized, and the strength of spring 87 need only be sufficient to assure proper seating of the valve, and is not affected by the hydrostatic pressure of the liquid in the tank.

In order to prevent the delivery of excessive amounts of air to the system, the tube from the pump to the chamber 81 is provided with the needle valve 95 which may be set to restrict the area to any desired amount. In addition a labyrinth tube 96 may be inserted. This consists of a member having a small clear hole in the center, surrounded by rings or a spiral groove. Such a tube is found to permit the passage of air at low velocities without great resistance, but to build up high resistance, due to turbulence, if the attempt is made to pass air through at higher velocities. The needle valve and labyrinth, either singly or together, serve to prevent the delivery of air to chamber 81 at excessive pressures.

I have thus provided hydrostatic gauge systems whereby the level of liquid may be continuously and correctly indicated except for such inaccuracies as are caused by leaks of air and other factors, and I have further provided means for replenishing this air and restoring the accuracy of the indications, and means for preventing such replenishment being accompanied by excessive pressures.

At least some of the claims appended hereto will be found of sufficiently broad scope to include the form of invention illustrated in my companion application Serial No. 744,950 filed October 21, 1924, entitled "Continuously indicating hydrostatic gauge" as well as the physical embodiments herein disclosed.

Having thus disclosed and described my invention and explained its purpose, what I claim as new and desire to protect by Letters Patent is:

1. A liquid-level indicating system comprising in combination: a pressure-responsive indicating device, pressure-conveying means subjecting said device to the pressure head of the liquid whose level is to be indicated, manually operable means for injecting air into said pressure-conveying means, and means regulating the flow of air into said pressure-conveying means and comprising a valve chamber and a valve member reciprocable in said chamber, said valve chamber having two valve openings, and said valve member adapted to close one of said openings when it is at one end of its reciprocable position in said chamber, and adapted to close the other of said openings when it is at the other end of its reciprocable position in said chamber.

2. A liquid level indicator, comprising in combination: a pressure gauge, an air pump, tubular connections between said pressure gauge, said pump, and the container of the liquid whose level is to be measured, means interposed between said air pump and said tubular connections limiting the pressure at which air may be delivered from said pump into said tubular connections, and means interposed between said pump and said tubular connections whereby the connection between said pump and said tubular connections is sealed when said pump is not operating.

3. A liquid level indicator, comprising in combination: a pressure gauge, an air pump, a valve chamber, a pressure-transmitting tube line connected to said pressure gauge, means forming a passage between said tube line and said valve chamber, a valve, a piston attached to said valve and reciprocable in said valve chamber, resilient means normally holding said piston at one end of its stroke and thereby holding said valve in position to seal said passage, means forming a passage through which air from said pump may be delivered to said chamber at one side of said piston to move said valve and open said first named passage, and means whereby the action of said pump in delivering air into said chamber in excess of a desired pressure seals said means connecting said pump and said valve chamber.

4. A liquid level gauge, comprising in combination: a pressure gauge, an air pump, a valve chamber, a pressure-transmitting tube line connecting with said pressure gauge, means forming a passage between said tube line and said valve chamber, a valve, a piston attached to said valve and reciprocable in said valve chamber, resilient means normally holding said piston at one end of its stroke and thereby holding said valve in position to seal said passage, means forming a passage between said pump and said valve chamber whereby the action of said pump in delivering air to said chamber lifts said valve and opens said first-named passage, valve means associated with said piston whereby said second-named passage is closed by the movement of said piston against said resilient means when the air pressure in said valve chamber exceeds a predeterminable value, and adjusting means associated with said resilient means, whereby the strength of said resilient means may be varied.

5. A liquid-level indicating system comprising in combination: a pressure-responsive indicating device, pressure-conveying means subjecting said device to the pressure-head of the liquid whose level is to be indicated, spring operated means for injecting air into said pressure-conveying means, a manually operable device to adjust said air-injecting means for operation by its spring, and valve means limiting the flow of air from said manually operable means to said pressure-conveying means and preventing the flow of air from said pressure-conveying means to said manually operable means.

Signed at Brooklyn, in the county of Kings and State of New York, this 15th day of October, A. D. 1924.

MORRIS M. TITTERINGTON.